United States Patent [19]

Berecz

[11] Patent Number: 4,695,212
[45] Date of Patent: Sep. 22, 1987

[54] COMPOSITE CHANNEL AND PLATE NUT ASSEMBLY

[75] Inventor: Imre Berecz, El Toro, Calif.

[73] Assignee: Microdot Inc., Darien, Conn.

[21] Appl. No.: 855,712

[22] Filed: Apr. 25, 1986

[51] Int. Cl.⁴ .............................................. F16B 27/00
[52] U.S. Cl. ...................... 411/85; 411/103; 411/112
[58] Field of Search .............. 411/84, 85, 87, 85, 411/90, 92, 96, 99, 103, 104, 105, 108, 112, 119, 120; 403/407.1

[56] References Cited

U.S. PATENT DOCUMENTS

| | | | |
|---|---|---|---|
| 2,144,553 | 1/1939 | Simmonds | 411/85 X |
| 2,381,233 | 8/1945 | Summers | 411/84 |
| 2,413,669 | 12/1946 | Whitcombe | 411/85 |
| 2,455,145 | 11/1948 | Swanstrom | 411/85 |
| 2,705,991 | 4/1955 | Reiner | 411/84 |
| 3,304,980 | 2/1967 | Koehl | 411/103 X |
| 3,322,177 | 5/1967 | Phelan | 411/104 |
| 3,456,706 | 7/1969 | Ollis | 411/84 |
| 4,488,844 | 12/1984 | Baubles | 411/85 |

FOREIGN PATENT DOCUMENTS

| | | | |
|---|---|---|---|
| 127524 | 4/1948 | Australia | 411/103 |
| 1218264 | 1/1971 | United Kingdom | 411/112 |
| 744157 | 6/1980 | U.S.S.R. | 411/103 |

*Primary Examiner*—Gary L. Smith
*Assistant Examiner*—Neill Wilson
*Attorney, Agent, or Firm*—Lyman R. Lyon

[57] ABSTRACT

A composite channel and plate nut assembly comprises a U-shaped channel having a plurality of apertures in the web portion thereof immediately adjacent the flanges therein for the acceptance of a plurality of downwardly extending lugs on the plate nut whereby reaction forces are accepted directly by said channel flanges upon threading of a bolt into said nut.

1 Claim, 6 Drawing Figures

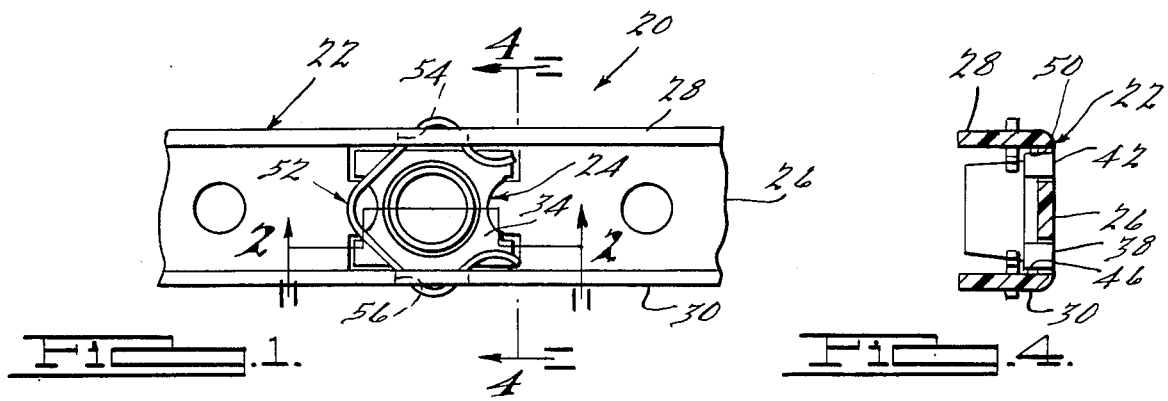
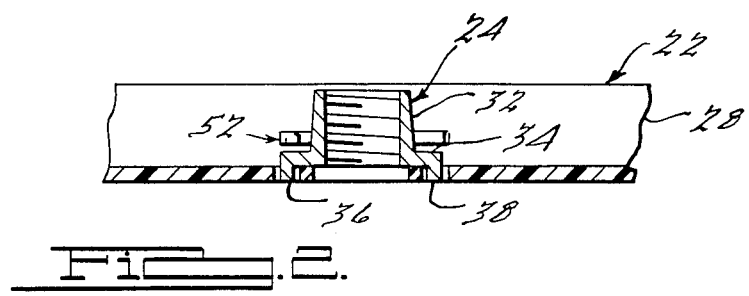
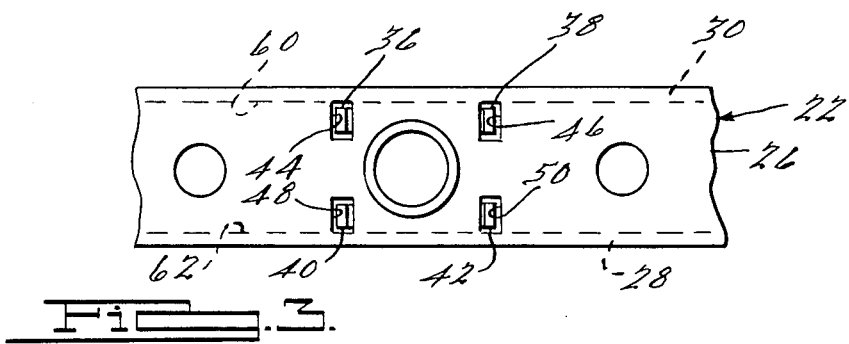
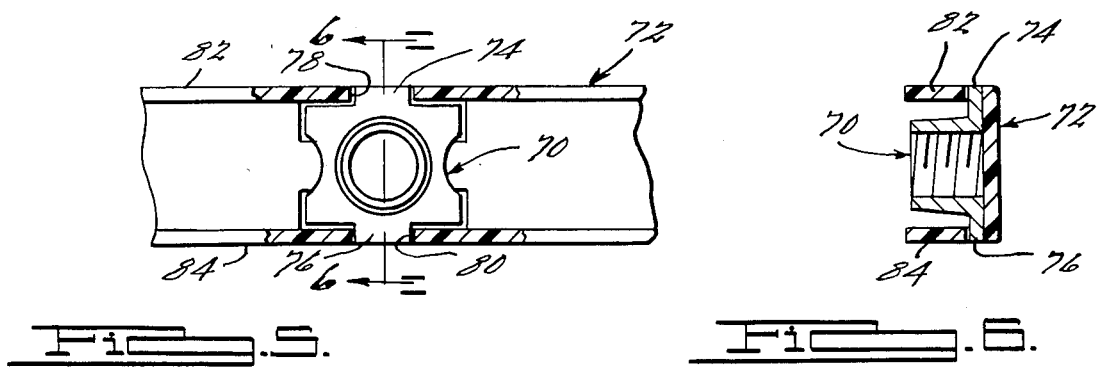

COMPOSITE CHANNEL AND PLATE NUT ASSEMBLY

BACKGROUND OF THE INVENTION

Fastening systems comprising a plate nut that floats relative to a supporting element to facilitate assembly of a screw therewith have been used as "blind" fasteners for some time in the aircraft industry. Such systems often comprise a plate nut and a channel which is riveted or otherwise permanently fastened to the "blind" side of a structural member. The channel generally has an aperture in its base surface which is oversize relative to the size of bolt intended to be inserted therethrough. The floating plate nut is generally removable from its supporting channel.

It is desirable for the floating plate nut of such assemblies to be anchored to its supporting channel in a manner that maximizes the ability of the channel to resist reaction torque thereupon due to advancement of a bolt through the plate nut. This feature becomes critical when the channel is fabricated from plastic material. Known plate nut assemblies are not totally satisfactory in that they either sacrifice strength necessary to resist reaction torque on the channel or are unduly heavy or bulky.

SUMMARY OF THE INVENTION

The instant invention relates to an improved floating plate nut and composite channel assembly that is of minimum weight and bulk yet exhibits maximum resistance to reaction torque exerted by said nut upon advancement of a bolt thereinto. This is accomplished by utilizing a relatively light, U-shaped composite plastic channel having a web portion with uniquely orientated apertures for the acceptance of reaction torque. The base flange of the nut is provided with detents that are accepted in said complementary, strategically located apertures in the web portion of the composite channel whereby reaction torque upon insertion of a threaded element into the nut is accepted without damage to the relatively light channel.

BRIEF DESCRIPTION OF THE DRAWINGS

FIG. 1 is a top view of a composite plate nut channel assembly in accordance with an exemplary constructed embodiment of the present invention;

FIG. 2 is a cross-sectional view taken along the line 2—2 of FIG. 1;

FIG. 3 is a bottom view of the assembly of FIG. 1;

FIG. 4 is a cross-sectional view taken along the line 4—4 of FIG. 1;

FIG. 5 is a view, similar to FIG. 1, of a modified system for retaining the nut in the channel; and FIG. 6 is a view taken along the line 6—6 of FIG. 5.

DETAILED DESCRIPTION OF THE PREFERRED EMBODIMENT OF THE INVENTION

In accordance with a constructed embodiment of the present invention, a composite plate nut assembly 20 comprises a channel 22 made from, for example, carbon fibre reinforced epoxy resin and a plate nut 24. The channel 22 is of U-shaped cross-section defined by a central web portion 26 and upstanding leg portions 28 and 30.

The nut 24 comprises a threaded barrel 32 having an integral base flange 34. The base flange 34 is provided with a plurality of integral downwardly extending lugs 36, 38, 40, and 42 that are accepted in complementary apertures 44, 46, 48 and 50 in the web portion 26 of the channel 22. It is to be noted that the apertures 40, 42, 44, and 46 are immediately adjacent the leg portions 28 and 30, respectively, of the channel 22. The nut 24 is retained on the web portion 26 of the channel 22 by a retainer spring 52 that overlies the base 34 of the nut 24 and is accepted in laterally aligned slots 54 and 56 in the flanges 28 and 30 of the channel 22, respectively.

In accordance with the instant invention, the outer wall portions of the apertures 44 and 46 are coplanar with an inner wall 60 of the flange 30. Similarly, the outer walls of the apertures 48 and 50 are coextensive with an inner wall 62 of the flange 28. Thus, the base flange 34 of the nut 24 bears against the inner walls 60 and 62 of the channel 22 while the lugs 36–42 on the nut 24 bear against the outer walls of the apertures 44–50 thereby maximizing the ability of the channel 22 to resist torque exerted by the nut 24.

It is to be noted that, as seen in FIG. 3, only the apertures 42 and 44 adjacent the flanges 28 and 30, respectively, provide for transmission of reaction torque on the nut 24 directly to the flanges 28 and 30. Thus, while the provision of four apertures 36, 38, 40 and 42 maximizes the ability of the channel 22 to handle torque applied to the nut 24, due to both assembly and disassembly of a bolt (not shown) with the nut 24, the critical feature is provision of the two apertures 44 and 50 for the acceptance of the lugs 36 and 42, respectively, adjacent the flanges 30 and 28, respectively, whereby said flanges 30 and 28 provide a relatively large bearing surface to minimize unit pressure on the channel 22 incident to advancement of a bolt into the nut 24.

As seen in FIGS. 5 and 6, a modified embodiment of the present invention provides for retention of a nut 70 in a channel 72 by a pair of laterally extending ears 74 and 76 that are accepted in complementary apertures 78 and 80 in a pair of flanges 82 and 84 of the channel 72, respectively. In all other respects the nut 70 and channel 72 are similar to the nut 24 and channel 22.

While the preferred embodiment of the invention has been disclosed, it should be appreciated that the invention is susceptible of modification without departing from the scope of the following claims.

I claim:

1. A composite channel and plate nut assembly comprising
    a U-shaped channel defined by a web portion and spaced side flanges,
    said channel having a plurality of apertures in the web portion thereof immediately adjacent the flanges therein whereby said flanges define and are contiguous with the laterally outer walls of said apertures, respectively, and
    a plate nut having a threaded portion for the acceptance of a complementary bolt and a base flange seated on the web portion of said channel, the base flange of said nut having a plurality of downwardly extending lugs thereon acceptable in the apertures of the web portion of said channel, respectively, the base flange and the lugs on said nut bearing against the side flanges of said channel whereby reaction forces upon threading of a bolt into said nut are accepted directly by said channel flanges; and
    means for retaining the base flange on said nut in juxtaposed relation to the web portion of said channel.

* * * * *